United States Patent
Eckhardt et al.

(10) Patent No.: US 11,128,726 B2
(45) Date of Patent: Sep. 21, 2021

(54) TRANSMISSION METHOD

(71) Applicant: Robert Bosch GmbH, Stuttgart (DE)

(72) Inventors: Andreas Eckhardt,
Mossautal-Guettersbach (DE);
Sebastian Mueller, Reichelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 16/577,081

(22) Filed: Sep. 20, 2019

(65) Prior Publication Data
US 2020/0099762 A1   Mar. 26, 2020

(30) Foreign Application Priority Data

Sep. 21, 2018 (DE) ...................... 10 2018 216 111.9

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 29/08* | (2006.01) | |

(52) U.S. Cl.
CPC .............. *H04L 67/26* (2013.01); *H04L 67/12* (2013.01)

(58) Field of Classification Search
CPC ..................................................... H04L 67/26
USPC .......................................................... 709/217
See application file for complete search history.

(56) References Cited

U.S. PATENT DOCUMENTS

| | | | |
|---|---|---|---|
| 9,912,619 B1* | 3/2018 | Kohli .................... | G06F 9/542 |
| 10,691,359 B1* | 6/2020 | McAllister ............ | G06F 3/0635 |
| 2005/0021622 A1* | 1/2005 | Cullen .................. | H04L 45/00 |
| | | | 709/204 |
| 2011/0295923 A1* | 12/2011 | de Campos Ruiz .... | G06F 9/542 |
| | | | 709/201 |

(Continued)

FOREIGN PATENT DOCUMENTS

| | | | |
|---|---|---|---|
| DE | 10 2017 202 360 A1 | 8/2018 | |
| WO | WO-2017168238 A1 * | 10/2017 | ........... G06F 16/367 |

OTHER PUBLICATIONS

D. Xiao, Y. Zhang and J. Chen, "A Real-Time and Reliable Forwarding Scheme of Publish/Subscribe System," 2014 Sixth International Conference on Measuring Technology and Mechatronics Automation, Zhangjiajie, 2014, pp. 51-54, doi: 10.1109/ICMTMA.2014.19. (Year: 2014).*

*Primary Examiner* — Hamza N Algibhah
(74) *Attorney, Agent, or Firm* — Maginot, Moore & Beck LLP

(57) ABSTRACT

The disclosure relates to a method for communicating machine control data of a mechatronic system in a network having publisher and subscriber network users that send control data via the network using a data interchange standard that supports a publish/subscribe communication model. In order to make such a method simple, fast and robust, it is proposed that a machine controller of the mechatronic system can be configured indiscriminately as a subscriber or publisher network user to communicate the control data. As a publisher, the machine controller provides the control data with a message identifier, encodes them as a network message using the data interchange standard and sends the network message via the network. As subscriber, the machine controller receives a network message intended therefor using a message identifier via the network and (Continued)

decodes the network message as control data using the data interchange standard.

19 Claims, 8 Drawing Sheets

(56) References Cited

U.S. PATENT DOCUMENTS

| | | | | |
|---|---|---|---|---|
| 2016/0315800 | A1* | 10/2016 | AlShaikh | G01V 11/00 |
| 2017/0295245 | A1* | 10/2017 | Battini | H04B 5/0062 |
| 2018/0024537 | A1* | 1/2018 | Chauvet | G06F 9/455 |
| | | | | 718/104 |
| 2018/0060799 | A1* | 3/2018 | Heyer | G06Q 10/063118 |
| 2018/0165061 | A1* | 6/2018 | Nicolich-Henkin | |
| | | | | H04L 12/282 |
| 2018/0173205 | A1* | 6/2018 | Miller | G05B 19/042 |
| 2018/0234514 | A1* | 8/2018 | Rajiv | G06F 9/546 |
| 2018/0321662 | A1* | 11/2018 | Nixon | G06F 13/364 |
| 2019/0109848 | A1* | 4/2019 | Clark | H04L 63/1441 |
| 2019/0109872 | A1* | 4/2019 | Dhakshinamoorthy | |
| | | | | H04L 67/12 |
| 2020/0059357 | A1* | 2/2020 | Fries | H04L 9/0861 |
| 2020/0186973 | A1* | 6/2020 | Doner | H04L 67/148 |
| 2020/0374205 | A1* | 11/2020 | Sharma | H04L 43/065 |

* cited by examiner

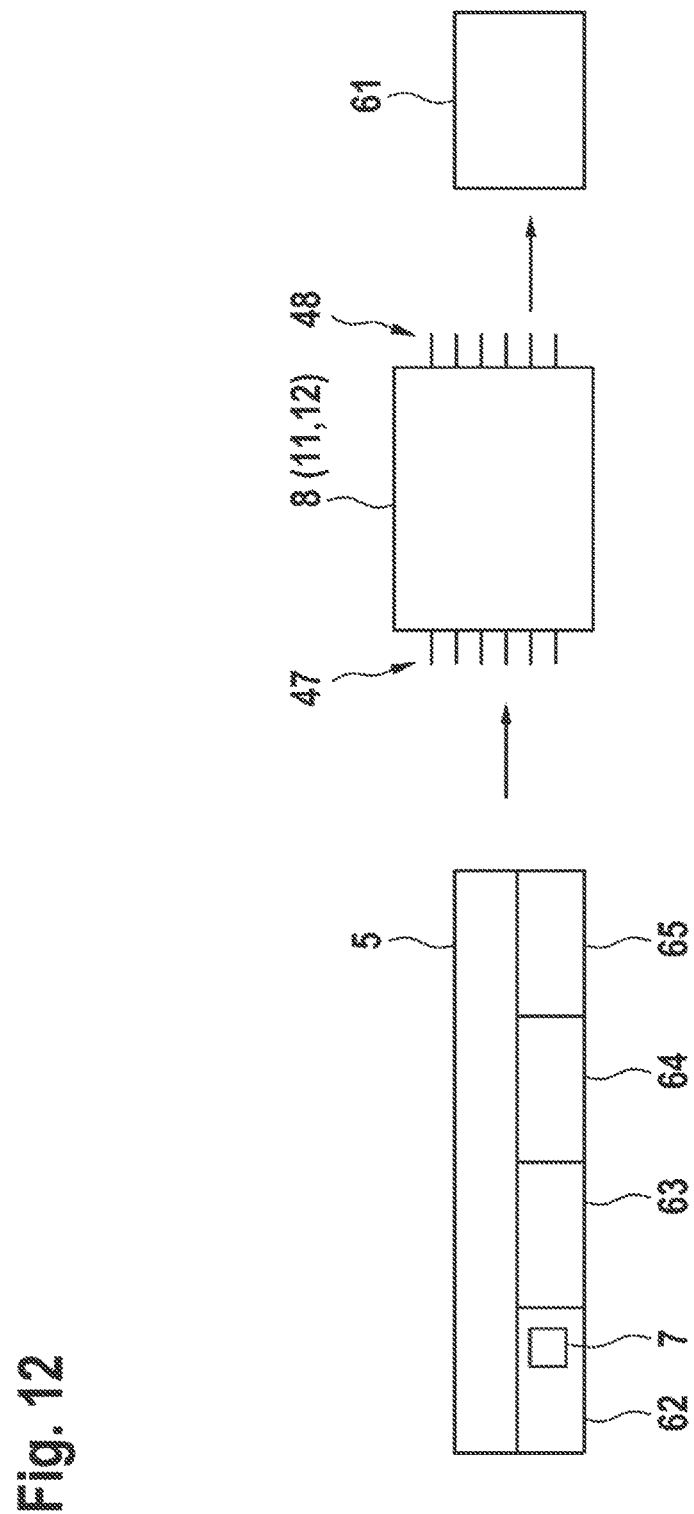

TRANSMISSION METHOD

This application claims priority under 35 U.S.C. § 119 to application no. DE 10 2018 216 111.9, filed on Sep. 21, 2018 in Germany, the disclosure of which is incorporated herein by reference in its entirety.

TECHNICAL FIELD

The present disclosure relates to a method for communicating machine control data of a mechatronic system in a network.

BACKGROUND

In the prior art, the method cited at the outset involves machine control data of a mechatronic system being communicated in a network having at least one network user that sends the control data via the network by means of a data interchange standard that supports a publish/subscribe communication model (publisher). At least one further network user receives the control data via the network by means of the data interchange standard (subscriber; also interchangeably referred to as procurer), wherein the publisher performs the transmission in the form of network messages that are each intended for subscribers decoupled from the publisher that are selectable as required. The subscriber selectively obtains the network message with its control data to be procured, in each case preferably under event control, or selects said network message and/or selectively takes the control data to be procured from a network message. Such a method is also referred to as a publish/subscribe communication method or a publish/subscribe communication model. It is intended for example for transmitting data of a bus controller in an industrial automation system, which to this end is in the form of a publisher.

Such a method provides simple structures on account of the decoupled communication. It requires at least one publisher and a subscriber. As a result, it is limited in terms of structure and equipment, however, has little flexibility in regard to system configuration and has only limited suitability for industrial automation.

SUMMARY

It is therefore an object of the present disclosure to provide a simple, fast and robust communication method, preferably to make said communication method flexibly usable and in particular to render it capable of demanding automation tasks. In particular, a communication method is intended to be rendered capable of modeling a flexibly configurable, mechatronic system environment faithfully to the system. In addition, a communication method according to the disclosure is intended to achieve an autonomous functionality for the machine controller, in particular to interoperably incorporate the machine controller into such a system for flexible system environments—in particular in the case of industrial automation.

This object is achieved by a method according to the disclosure. It is a finding of the disclosure that a machine controller flexibly configurable as a subscriber or publisher, which already has—in particular bidirectional—coding capabilities according to the established data interchange standard, unlocks the advantages of the publish/subscribe communication architecture for a multiplicity of automation tasks. At the same time, a high level of flexibility for the system configuration is rendered possible—such as for example enabling, and rendering compatible, reconfiguration of controllers, support for a plurality to multiplicity of controllers, incorporation and removal of machine controllers into and from a communication network and machine control for asynchronous communication and for realtime communication in equal measure.

The use of mechanisms of the data interchange standard in a manner specifically selected according to the disclosure achieves this when there is a high level of interoperability. The disclosure realizes a generic functionality on the runtime system of a machine controller, so that control becomes freely configurable with a data interchange standard having a high level of interoperability; moreover, the machine controller is rendered capable of an autonomous, freely configurable network infrastructure and of network communication by virtue of its having the freely configurable and selectable capabilities (for example coding functions) according to the data interchange standard that are required for the network services. As a result of the disclosure providing a message identifier according to the data interchange standard, it is also universally usable.

Both the machine controller according to the disclosure and other or all network users with which communication takes place according to the disclosure can be operated in compliance with a data interchange standard. Such a data interchange standard according to the disclosure can be an industrial communication protocol, for example a machine-to-machine communication protocol, such as OPC-UA. In this case, OPC-UA stands for Open Platform Communication—Unified Architecture. The OPC-UA allows networking of a wide variety of component manufacturers on a manufacturer-independent basis. OPC-UA extends OPC by substantial properties, such as for example the transmission of semantic information and the extended options for calling methods, and allows a standardized and cross-manufacturer data interchange between various components, specifically independently of programming language and operating system. OPC-UA uses a standardized communication protocol and uses standardized interfaces and also functionalities to connect the devices of different levels of the automation pyramid. Above all, OPC-UA can be used to interchange data from the field level with levels of the automation pyramid that are above that. As such, OPC-UA can be used for example to transmit data from a realtime area of the field level, in which the field devices communicate via a realtime-compatible field bus, to a management level or control level of the factory automation, in which the planning, flow control and logistic processes take place. By way of example, OPC-UA technology allows standard networking of machine controllers, such as for example CNC controllers, motion controllers for e.g. packing machines or logic controllers such as e.g. programmable logic controllers (PLCs), with the control and management levels situated above. When machine controller or PLC is mentioned herein, this must always be regarded as being interchangeable with all the aforementioned controllers, and vice versa.

Preferably, the use of OPC-UA-TSN (Time Sensitive Networking) is also possible for the disclosure, since it allows useful improvements in realtime capability for industrial automation to be achieved by means of the disclosure. This will be discussed more specifically later on.

The references herein to OPC-UA also apply to other data interchange standards that can be used for the disclosure. However, substantial references are made herein to OPC-UA in exemplary fashion, OPC-UA being supposed to be interchangeable in this context with functionally identical or with similar data interchange standards or else with communication protocols and standards, and vice versa.

According to the disclosure, the machine controller controls a mechatronic system. The mechatronic system firstly has mechatronic components, that is to say for example electrical components, electronic components, hydraulic components, mechanical components, pneumatic components or components combined from these principles or other kinds of components, which are combined in a system interconnection and as such act as a combined, mechatronic unit or mechatronic machine. This can be for example a machine tool in which multiple electric motors drive the axles of the machine tool. Components of the mechatronic system are preferably coordinated by one or more machine controllers, if need be synchronized and controlled as a system interconnection. In this case, the machine controller is for example a logic controller, such as for example a programmable logic controller (PLC), a motion controller, such as for example a CNC (Computer Numeric Control) or—expressed in general terms—a superordinate system controller, which can also be compiled from multiple, different control platforms and architectures. The machine controller can in this case be an integrated machine controller that also incorporates a realtime component, in software or hardware, and a superordinate logic controller, process controller or general controller in one unit, preferably in a housing.

Such a machine controller can be a separate and dedicated piece of hardware, that is to say for example an electronic component of the mechatronic system that is configured as a physical machine controller. It can alternatively be an embedded controller or a virtual controller, for example a controller emulated or virtualized on an industrial PC. A controller can finally also be realized as a software application on an (industrial) PC.

According to the disclosure, a machine controller is incorporated into the network as a network user for the purpose of data interchange. The machine controller receives, sends, processes, manages, coordinates, produces or generates machine control data. Such data are for example data related to the mechatronic system or coming from the mechatronic system. These control data are communicated, that is to say sent and/or received, by the machine controller. This is a fundamental prerequisite of smooth function execution for a mechatronic system. This is the starting point for the disclosure, in that the machine controller can be configured indiscriminately as a subscriber and/or as a publisher of a publish/subscribe communication architecture for the purpose of communicating the control data. It is possible for the data interchange standard to provide different transmission architectures that the disclosure uses on an application-specific basis. In the present case, a publish/subscribe architecture of the data interchange standard is used for the transmission. A characteristic of such a publish/subscribe architecture is that the publisher does not individually address the subscriber(s) and hence does not necessarily "know" it/them.

According to the disclosure, machine control data (for the sake of simplicity also referred to as "control data" for short herein) having all the advantages of a publish/subscribe architecture can be provided (for example to distribute control data for a plurality of subscribers at the same time and/or cyclically). To this end, the machine controller can be configured as a subscriber or publisher compliant with the data interchange standard. The transmission in this case can take place in the form of network messages compliant with the data interchange standard, which are each provided for a flexible number of subscribers, wherein a network user—stated generally—is governed by the message identifier in selectively obtaining its message to be procured or selecting said message and/or selectively removing the data record of interest to it from a network message on the basis of the message identifier.

In the aforementioned publish/subscribe architecture, a publisher performs the transmission in the form of network messages compliant with the data interchange standard. In this case, the data are denoted and transmitted using methods or functionalities that are standardized in the data interchange standard. Such messages are in each case provided for a flexible number of subscribers.

The subscriber can be governed by the message identifier in selectively obtaining its message to be procured (e.g. when using a publish/subscribe architecture with unicast addressing, see below). Alternatively or additionally, the subscriber can selectively extract the data record of interest to it from a thus identified or received network message on the basis of the message identifier (e.g. when using a publish/subscribe architecture with multicast addressing, see below).

Unicast addressing involves sender information, such as for example a publisher ID, e.g. the identification of a sending machine controller, being written in a header (part of a message identifier according to the disclosure) of a network message; additionally, the message identifier is able, in the case of unicast addressing, to carry information (e.g. IP address) of the receiver or addressee that is used to route the respective network message with the control data to the respective intended addressee. Preferably, such a network message contains control data only for the intended addressee, so that a separate unicast network message is generated, transmitted and appropriately routed for each addressee in the network.

By contrast, a network message according to the disclosure carries control data for multiple receivers—possibly in addition to the aforementioned sender information—during multicast addressing, so that each network message is routed to multiple network users and the message identifier is used by the network user to extract its control data relating to it from the network message.

The configuration capability of the machine controller indiscriminately as a publisher and/or as a subscriber can be provided for in a piece of firmware and/or in a machine control application of the machine controller, for example, so that the user merely needs to address or select the applicable configuration of the machine controller. In the case of a machine controller in the form of a software application, for example, the configuration option can be realized in software of the applicable application. A fundamental aspect in this case is that the configuration takes place indiscriminately; this can mean that a machine controller can be provided for and/or configured as appropriate at any time and/or in freely selectable fashion and/or automatically or in manually adjustable fashion.

The machine controller can be configured both as a publisher and as a subscriber simultaneously or at the same time in this case; this is e.g. a realization of a return channel of a field bus architecture (see later on). It can also be configured indiscriminately either as a subscriber or as a publisher. In this context, the applicable configurations of the machine controller are communication entities of the machine controller between which it is possible to change arbitrarily—by simple configuration—at any time. In summary, the machine controller can have no, one or more different publishers (communication entities) and/or no, one or more different subscribers (communication entities) simultaneously or with staggered timing.

For the industrial automation, a machine controller can receive control data, for example for synchronization with (in particular motion) processes managed by another controller. Such a machine controller, which then acts in particular as a slave in a master/slave topology in a field bus architecture, can, advantageously likewise in process-synchronous fashion, return control data to the network. Equally, a machine controller that sends the control data via the network (for example the master in the aforementioned master/slave architecture) can receive returned control data. Such control data, which are also returned contrary to a hierarchy or preferred communication direction of control components, can be used for process control and can comprise for example motion setpoint values, in general setpoint values, status data, actual values or sensor data. Therefore, there is frequently provision for a complementary channel, also called return channel, for a communication for technical reasons. The disclosure has found that for the corresponding implementation of such a return channel—for example realized in a SERCOS bus topology, in particular in a SERCOS double ring, or in any other field bus topology—a machine controller can act (also at the same time or simultaneously) as a publisher and as a subscriber in a topology according to the disclosure.

According to the disclosure, the data interchange standard provides for defined presets, for example configuration parameters. Such presets are adjusted in the machine controller, are already preset or can be selected indiscriminately. As a result, the machine controller configuration according to the disclosure as a publisher and/or as a subscriber also takes place. In this case, communication parameters and/or environmental variables relating to communication and/or communication conditions provided for within the framework of the publish/subscribe communication architecture provided for according to the data interchange standard are set and/or adjusted and/or selected. In addition, the configuration can comprise which data are sent and/or received, which communication cycles are provided for and also the network protocol used. In particular, however, the applicable configuration stipulates whether the relevant machine controller acts as a publisher or as a subscriber in the mode of operation. This allows the flexibility of a networked, industrial automation system to be modeled or taken into consideration very faithfully to a system.

A machine controller that, in a mechatronic system, makes available data for synchronization with other system components would be configured for example as a publisher that cyclically publishes the relevant data and makes them available in the network. In such a configuration, the machine controller would have to be regarded analogously to a system master that distributes synchronization data into the network. A machine controller to be synchronized with such synchronization data, for example, could then be configured as a subscriber for these synchronization data. Stated in general terms, such a configuration results in the role of the applicable machine controller as a publisher (for example master) or as a subscriber (slave) and the type and volume of the data interchanged in the process being stipulated.

In the case of the configuration as a publisher, the machine controller has, according to the disclosure, the capability to initially provide the control data with a message identifier. Such a message identifier is used for correctly handling such a network message in a publish/subscribe communication architecture according to the disclosure. A message identifier identifies the network message, for example as coming from the machine controller configured as a publisher. However, it can also contain other information pertaining to the message, such as for example content information concerning the message, meta information of the message, such as for example message length, variables contained, composition or size or coverage of the message, timing information, such as for example a timestamp, routing information or the like. Similarly, the message identifier can have semantic information, i.e. in particular meanings and/or indications of content for the control data contained. Information about the origin of the control data and/or information about the unit writing the data (for example a writer identification) can also be comprised by the message identifier. The aforementioned properties of the message identifier accordingly also apply to the case of the configuration as a subscriber, the explanations above possibly needing to be adapted to fit the sense.

Also in the case of the configuration as a publisher, the machine controller has the capability of encoding the control data intended for data interchange as a network message. During the encoding (the explanations below are also applicable mutatis mutandis to the decoding, that is to say to the entire coding process), mechanisms or else predetermined methods of the data interchange standard are used, for example standardized coding functionalities predetermined therefor. By virtue of the encoding, the control data are compiled into an applicable network message and formatted to be communicable via the network architecture. Network messages are practically created from the control data, wherein, according to the standard, there is provision for a header that substantially contains transport and meta information concerning the network message; equally, the encoding by means of the encoding function also results in the payload being set up (in particular in compliance with the standard), which represents the control data formatted and/or converted according to the data interchange standard. Furthermore, the encoder provided for according to the disclosure undertakes the arrangement and the sequence and also the writing of the information units to be transmitted, for example of databytes, into a resulting network message having the control data that is to be transmitted.

The network message thus produced is then compliant both with the data interchange standard and with a network protocol supported by the data interchange standard and is sent as a network message from the machine controller via the network. These functionalities flexibly configurable in a machine controller mean that the disclosure provides a high level of flexibility, so that this allows for the diverse possibilities for refinement of a mechatronic system, in particular an industrial automation system. The disclosure allows the communication method to be carried out faithfully to the system when the entire system is reconfigured—including more frequently. The reason is that the communication method can then be adapted such that the machine controllers involved in the system can be configured flexibly as (one or more) publishers and/or (possibly also simultaneously) as (one or more) subscribers.

If the machine controller is configured as a subscriber, all the explanations above apply accordingly. The machine controller then receives a network message intended for the subscriber by means of a message identifier via the network. The explanations pertaining to the content of the message identifier herein then apply accordingly (in particular mutatis mutandis); as a subscriber, the machine controller uses the message identifier to determine whether and which data or network messages or what part of the network messages are/is intended for the relevant subscriber. The mechanisms explained above are used by the machine controller to decode the network message to produce the control data intended for reception having the means and measures explained above.

Preferred refinements that do not limit the subject of the disclosure are described in the embodiments.

A high level of flexibility for the control data communication according to the disclosure is achieved by virtue of the machine controller as a publisher providing the control data to be encoded and/or the encoded network message and the machine controller as a subscriber providing the received network message and/or the decoded control data in a memory area that is static in regard to the machine controller (in particular permanently allocated for the applicable function) and/or nontemporary (in particular nonvolatile and/or permanent, more particularly independently of the execution, the calling or the termination of the applicable functionality according to the disclosure) and/or global (in particular accessible across applications in the address space of the controller). As a result, any time access—for example independently of the function or procedure currently being executed in the machine controller—to the control data records is possible on an information technology basis. In addition, this also allows modulization of all or selected machine controller functionalities according to the disclosure to take place. As such, the configuration processes (in each case the configuration as a subscriber and/or publisher), encoding and/or decoding and also the sending and/or receiving, in each case in particular by using network services supported by the data interchange standard, can be realized in separate modules that are usable individually and callable according to requirements. If a memory area as mentioned at the outset is used, the advantage arises that a provision module embodied in software, for example, can be used like a component or a chip whose input has the control data (also to be encoded and decoded) applied to it and whose output has the output data (such as for example the encoded network message or decoded control data) applied to it—in particular practically permanently—and, as such, said input data and output data are available on an ongoing basis and/or practically continuously and/or across controllers and/or across entities and/or for any control program at any place. This will be discussed more specifically later on.

The cited method involves the provided/required memory being allocated during the initialization, for example. The publish/subscribe communication model—in particular that of the OPC-UA standard—provides a high level of memory handling dynamics. In particular, the memory used can be managed flexibly to a high degree—that is to say for example varied in respect of the size used and needed. If the machine controller is configured as a publisher, it is possible—for example to ensure the compatibility of the OPC-UA memory dynamics with the static allocation—for the configuration of the static memory provided for at the controller end to be read according to the disclosure and taken into consideration during the communication of the control data (e.g. by ensuring a maximum size of the data units used, such as for example control data and/or network message length).

If the machine controller is configured as a subscriber, the case could arise that a message is received that could be theoretically longer than expected. In order to improve the compatibility, consistency of the data and/or the efficiency, the configuration of the static memory provided for at the controller end can be read according to the disclosure and taken into consideration during the communication of the control data; in the cited case of the subscriber, this is effected e.g. by a static memory that is configured to be larger than the maximum length of a network message or by jointly sending the message length with the network message or generally by communicating the (individual and/or maximum) message length. In the event of a maximum limit approved at the controller end being exceeded, it would be possible, for example after the message length is read, for an adaptation of the configuration, in particular an initialization with a new, maximum message length, to take place. This can take place for each message and/or as required and/or on request.

Provision for the knowledge of the message length is in particular also independent of what has been stated above, since the transmission time and the configuration of the network architecture can also be dependent thereon. The aforementioned measures are therefore generally advantageous in industrial automation environments, in particular with at least local real time areas, since the knowledge of the message length is generally also usable to ensure the integrity of the real time or to meet communication requirements or communication constraints.

The disclosure provides a high level of interoperability, in particular in different network environments and/or for different communication architectures, when the encoding and decoding can take place using methods of the data interchange standard. In this case, the encoding relates primarily to the configuration of a machine controller as a publisher, where the control data are encoded to produce a network message, whereas the decoding relates primarily to the configuration of a machine controller as a subscriber, where the network message is decoded to produce the control data. In the present case, mechanisms standardized in the data interchange standard are used for these functionalities, referred to in combination as coding. These can be for example standard-specific encoders and decoders provided for in the applicable data interchange standard. By way of example, OPC-UA encoders and decoders can be used. This can also encompass specific variables, data types or, generally, information-technology objects and types being used (for example timestamps standardized in OPC-UA).

The aforementioned mechanisms in this case can be algorithms, standards or even standardized coding formats used or referenced generally in the data interchange standard. Alternatively or additionally, however, it is also possible for methods in the information-technology context to be used. To this end, the disclosure uses a predetermined data interchange standard supported by the machine controller. The data interchange standard has standardized method calls such as are able to call—including via the network—methods integrated locally in respect of the machine controller. In general, such method calls are intended to call specific sequences, services, algorithms, methods or the like or to address them on the machine controller. Methods in the narrower sense can be function calls from objects that, following their execution, hand over a "successful" or "unsuccessful" status. In this context, a method is for example generally a component of an object, and in the broader sense a callable software function, in particular as a component of an object. The locally callable methods also include local, executable programs or program parts. The data interchange standard has been used to standardize the method call in particular such that a network user that likewise supports the data interchange can use this method call to call a method of the machine controller locally via the network. Local methods of this kind are used by the disclosure to stipulate the coding functions and/or to activate them locally on the machine controller within the context of the disclosure for the purpose of communicating the control data.

To this end, at least one predetermined and/or preconfigured, local method of the machine controller is called. This local method can be used for example to address, talk to, actuate, set, alter or configure a service, an object or a variable of the machine controller that is characteristic of a coding function. Preferably, the methods available from the machine controller are identified by standard-compliant requests—also from the network —, preferably on the basis of the objects saved as owners of the supported methods.

The disclosure achieves a high level of up-to-dateness of the control data, adaptation of the volume and coverage of the control data and in particular also a high level of flexibility by virtue of the communication of the control data and/or the type and/or content and/or volume of the communicated control data being configurable at the runtime of the machine controller and/or remotely and/or in the machine controller itself. This means in particular that configuration, i.e. variation, can be effected practically at any time, i.e. for example during the active execution of tasks or of realtime tasks, as mentioned at the outset. In this case, undisturbed and/or uninterrupted continuation of the runtime tasks of the machine controller is ensured. While for example the retrieval or use of control data from the runtime task is taking place, the configuration is initially performed as depicted above. Only when configuration is complete is the newly configured transmission begun. To this end, the aforementioned methods and mechanisms are used to perform the configuration, for example variables defining the volume and content of the control data are produced, changed or erased. This is discussed more specifically in detail later on.

The transmission of the control data can, but does not have to, take place at the runtime of the machine controller. Since the disclosure already meets the high demands on configurability at runtime, the communicated data can be configured and communicated at any time, that is to say even during an interruption to the runtime, during the inactivity of the machine controller, on startup, maintenance, repair or analysis of the machine controller and/or of the mechatronic system or of its components.

In particular the transmission itself, that is to say transmission cycle, transmission parameters, network protocols or communication stack, but also the relevant control data that are communicated, are changed, erased or newly added, and/or the number and content of all data and parameters to be communicated are configured. In this case, the aforementioned configuration optionally takes place remotely and/or locally in the machine controller itself. In the case of a remote configuration, for example a network user of the network in which the relevant machine controller is also incorporated sends configuration information to the machine controller, said configuration information is possibly acknowledged by the latter (that is to say that correct reception thereof is reported back to the network user) and the configuration information is used there to perform the configuration. The remote configuration can also result in the remote network user calling local methods of the machine controller for configuration. If the configuration takes place locally in the machine controller, this can be accomplished for example by using an input device or a specific piece of software—for example for startup.

According to the disclosure, in particular specific properties characteristic of the communication of the control data in the publish/subscribe architecture according to the disclosure, in particular communication parameters, are set and configured. These can be for example transmission parameters or environmental variables characteristic of said architecture, such as for example an identifier of the publisher, an identifier of the subscriber, a message identifier and/or an identifier of the unit writing the control data. If the relevant machine controller is configured as a subscriber, this also encompasses information relating to a network user as publisher whose network messages are relevant to this subscriber. This can be for example the information concerning the publisher to which the relevant subscriber is supposed to "listen". Conversely, in the case of a machine controller configured as a publisher, the configuration can relate to parameters relating to the transmission, denotation, receiver properties, addressing of network messages and/or control data; by way of example, it can also encompass the device as a multicast or unicast architecture with the applicable communication parameters for the relevant architecture.

The publish/subscribe communication architecture according to the disclosure results in a multiplicity of specific settings and/or parameters needing to be set and filled. On the other hand, it is a finding of the disclosure that, for use with control data of a mechatronic system, a multiplicity of such specifics are indifferent, in particular irrelevant to the control data or merely relevant to the communication, but can be ascertained in identical and/or automated fashion for a multiplicity of applications.

In order to make the communication of control data both more reliable and more easily manageable, it is proposed that predetermined communication parameters are automatically prefilled by the machine controller during the configuration (automated communication parameters). This increases the reliability and simplicity of the communication according to the disclosure, and the effort of manual filling and the unreliability of manual filling are also reduced or eliminated. Additionally, this increases the reproducibility of the method according to the disclosure by virtue of the variants for the configuration being reduced by the aforementioned automated communication parameters. Stated in general terms, for example more complex parameters, controller-internal communication parameters and/or parameters that are indifferent in regard to the mechatronic properties or to the control data are prefilled in automated fashion.

In particular, to simplify the method further and to ensure intuitive and practically instinctive control of the method or of a machine controller according to the disclosure, predetermined communication parameters of this kind are treated as concealed, internal parameters and are hidden from a user performing a configuration. There can in particular be provision for access levels for different classes of users; in the case of a machine controller, for example, all of the automated communication parameters can be hidden from an operator setting up or converting the machine controller for every day, envisaged use. Automated communication parameters of this kind can encompass for example an identifier of the publisher, of the subscriber or of the writing or reading unit, a multicast address or general connection information, such as for example IP addresses of the machine controllers/network users/units involved.

The technical method simplification of hiding such parameters can be complemented by a graphical representation modeling the technical process of the configuration of the communication (in particular intuitively). To this end, for example a representation of a specific publisher for example on a display can be connected by means of an input device or other input means to a—in particular to one of multiple depicted—subscriber(s). This can be accomplished particularly easily from a technical point of view by virtue of the representation of the publisher being able to be dragged to a subscriber or to a graphical representation (e.g. in the form of an icon) of a subscriber by the user using the input means, e.g. via touchscreen or using a mouse or using an input cursor controller, as a result of which the aforementioned automatic setting of even concealed parameters is accomplished. In the cited example, everything behind the connection of said publisher to said subscriber, for example, would be carried out automatically using said user input (for example publisher identifier, multicast address, identifier of the writing unit would be automatically set).

For an engineer setting up, starting up, maintaining, repairing, reprogramming, substantially reconfiguring, extending or commissioning a machine controller for the first time, for example, it is also possible for the automated communication parameters to be—in particular selectively—shown, however.

The control data communication configuration according to the disclosure becomes particularly flexibly and suitably adaptable to the respective application as a result of an appropriate and deliberate distinction being drawn between automated communication parameters—as described above—and distinctly unautomated communication parameters. To this end, the disclosure proposes that—in addition or as an alternative to the aforementioned automated communication parameters—predetermined communication parameters are stipulated during the configuration by external setting, in particular by user inputs, during the configuration (external communication parameters). For the sake of clarity, it should also be pointed out here that all said parameters can also in general be (in particular technical) attributes. In this respect, the terms parameter and attribute are each used interchangeably in this document. External communication parameters of this kind are, stated in general terms, technically simpler, less complex parameters that are easily fixable by an everyday user and instructive. In particular, there can be parameters relevant in reference to the mechatronic properties of the underlying system to which the control data relate, or parameters of the mechatronic system directly. These can also be user parameters that are directly, easily and explicitly fillable for the purpose of converting for example a manufacture. These can fundamentally be all the parameters cited herein, preferably with the exception of the communication parameters cited as typical, automated communication parameters under the above description pertaining to one embodiment. In particular, these can the selection and volume of the specific control data to be communicated, the control data themselves, or modes of communication, such as for example unicast or multicast.

In order to be able to perform the configuration as independently as possible of the technology of the participating machine controller and/or independently of the network technology used, it is proposed that the configuration—as mentioned above—takes place by means of method calls of the data interchange standard for methods in the machine controller. Methods of the data interchange standard can be understood to mean the dedicated methods provided for in OPC-UA, for example, that are described earlier on; on the other hand, the methods cited in this document can also be regarded generally as mechanisms of this data interchange standard (for example OPC-UA) that are standardized in the data interchange standard. Everything stated herein applies—unless expressly indicated otherwise—in each case both to a machine controller configured as a publisher and to a machine controller configured as a subscriber. Such methods can encompass for example the configuration of the communication parameters, the setup of the applicable publisher-subscriber communication connection, the selection and volume of the control data to be transmitted, the selection of an (in particular configurable) network service. The methods and mechanisms of the data interchange standard in the machine controller can be addressed or called locally by a program or an entity of the machine controller or else remotely via a network user, in particular another machine controller.

The spectrum of use of the disclosure for industrial automation applications is extended by virtue of the communication of the control data taking place in real time. As a result, it is also possible for industrial automation applications requiring such communication in real time to be covered. To this end, the implementation or calling of the communication of control data takes place from the realtime domain of a machine controller, for example a programmable logic controller (PLC) or a computer numeric control (CNC). In particular, the communication of the control data takes place in real time using the TSN standard of a realtime-compatible Ethernet (preferably according to IEEE 802.1Q). In particular, the control data are communicated in real time according to the realtime classes 0 (best effort), 1 (background) or 2 (excellent effort) from IEEE 802.1Q, and also according to real time class 3 (critical applications) for demanding manufacturing tasks and for a motion controller or for machine tool controllers.

In addition, to ensure real time compatibility, what is known as a virtual network (VLAN) can also be set up, in particular with augmented prioritization options, in particular likewise according to IEEE 802.1Q. To this end, the Ethernet frame by means of which the communication takes place can be extended by a VLAN tag that has a specific size (for example 4 bytes). The realtime compatibility of the transmission protocols used can be set up—in particular for realtime-compatible ethernet (TSN)—both above the actual transport layer and above the network access layer or finally by means of a suitable modification of the network access layer.

In particular for industrial automation, it is necessary to continuously monitor, maintain and ensure the reliability, punctuality and freedom from error of the communication of control data. To this end, it is proposed that a quality-of-service diagnosis of the network message takes place. This can also encompass a diagnosis and rating of the respectively received network telegram or network message, of the header of the network message or else of the payload or the contained and extracted control data. Fundamentally, this continuously monitors the quality of the communication service from the point of view of the user, in particular for whether and to what degree the quality of service meets the requirements of the application.

Such a quality-of-service diagnosis comprises in particular the latency, the jitter, the packet loss rate and the data throughput, i.e. the average volume of data transmitted per unit time. In particular, the disclosure can have a function (in particular of a function block of a programmable logic controller, in this regard see later on) to evaluate the quality-of-service parameters contained for the publish/subscribe communication architecture used, for example the sequence number, a timestamp, status codes of the network messages or else a version check on the network message (in particular whether the version of the message has changed) and to output resulting diagnosis information in a structure adapted in line with need.

In order to render the communication architecture used capable of industrial automation tasks as appropriate, the consideration and evaluation of a timestamp in accordance with the disclosure is particularly advantageous. In this case, for example the minimum time that has occurred between two messages being received or sent, the maximum time and/or average time are evaluated, the period of time that has elapsed since the last message was received or sent and/or the time that has passed since the last, lost packet. A sequence number that is carried can be used to identify, count and/or take into consideration lost packets (in particular lost network messages).

The diagnosis information obtained is preferably taken into consideration for the further processing and use of the control data. It is also possible for a rating of the quality of the network connection, of a selected network segment or of the entire network or network segment relevant to the mechatronic system in respect of the communication quality of the control data to take place using cumulated and/or aggregated diagnosis data. This rating can be used for rating the reliability of the communication of control data, for example. To this end, there is preferably provision in the network transmission protocol (in particular in the structure of a transmitted data packet or of a transmitted data telegram) for a quality-of-service slot. In this context, it is advantageous to derive from the evaluated quality-of-service parameters a time characteristic for the quality of service of the considered communication connection, of a network segment, of a specific communication path and/or of the entire, relevant network infrastructure.

Since the publish/subscribe communication architecture according to the disclosure involves substantially decoupled communication (in particular by means of UDP protocol, Universal Datagram Packet protocol), the communication infrastructure possibly provides no diagnosis functionality or only a diagnosis functionality that is inadequate for automation engineering. Therefore, such a functionality can take place on the application. To this end, quality-of-service parameters—in particular the quality-of-service parameters that the publish/subscribe architecture of the OPC-UA standard used contains—are evaluated according to the disclosure, and the diagnosis information is output in a structure suitable therefor. The diagnosis and quality rating described are also used for the further processing and use of the control data, for example for ensuring or determining the consistency and/or isochronism of the control data; this can be advantageous in particular for realtime applications. From a technical point of view, there is provision for a quality-of-service slot therefor in the network transmission protocol (or the structure of the data packet), for example.

If the machine controller is configured as a subscriber, the quality-of-service diagnosis of the network message is particularly advantageous because in this case the diagnosis data can be used for the transmission or rating or taking into consideration the reliability of the transmission, for example. By way of example, the ascertained quality-of-service parameters can be used to derive a confidence level for the transmitted control data. If a network diagnosis is effected by a subscriber that receives for example control data from multiple publishers, the result can be significant for the received data from—in particular all—relevant publishers and can possibly also be applied or transmitted to other network users/publishers. An aggregation of diagnosis information can take place, as a result of which it is possible to draw conclusions about the stability of the network or a network segment or of a communication path. The actual diagnosis information obtained for a communication path can also be used to evaluate the quality of service of this path, and another path can be used if the quality of service is poor, for example.

In order to ensure the interoperability of the transmission method according to the disclosure, it is proposed that the encoding and decoding takes place by using a standardized coding format, in particular using JSON (Java Script Object Notation) or UADP (Unified Architecture Datagram Packet). The control data can be written to a container provided for according to the standard. The standardized coding format used can (but does not necessarily have to) be a coding format of the OPC-UA standard. In the OPC-UA specification, there is provision for the JSON and/or the UADP coding format for this purpose. The transmitted control data and the data structure and/or data format thereof can also be non-OPC-UA-compliant; compliance is achieved by means of the encoding/decoding. Preferably, a coding format is used that also encodes and decodes the message structure. Optional coding with the UDP transport protocol and for example binary-coded network messages manages in particular frequent transmissions of small volumes of data particularly efficiently. Overall, preferably normalized message protocols can be used (for example AMQP—Advanced Message Queuing Protocol or MQTT—Message Queue Telemetry Transport).

The disclosure becomes usable in largely modularized and flexible fashion as a result of an individually callable or addressable publisher module configuring the machine controller as a publisher and/or providing the control data with the message identifier and/or encoding said control data as a network message by means of the data interchange standard. Such a module can be a hardware component of a machine controller (for example of a PLC), for example. It is preferred if the individually callable module is a software module, for example a function, a procedure or a function block. A functional module of this kind can be called or addressed and hence activated at any time. As a result, the aforementioned functionality of the module is made available at any time—even independently of other options/functions not provided for in the module.

What has been said in the previous paragraph also applies mutatis mutandis when an individually callable subscriber module configures the machine controller as a subscriber and decodes a network message intended for the subscriber by means of the message identifier as control data by means of the data interchange standard. In addition, the explanations above also apply if a network service module, in particular an individually callable network service module or a network service module integrated in another module, receives the network message via the network when a machine controller is configured as a subscriber or sends the network message via the network when a machine controller is configured as a publisher.

The objects mentioned at the outset are achieved, and the aforementioned advantages are achieved, by virtue of a machine controller, in particular a PLC, being configured to carry out a method according to one embodiment. Such a machine controller is in particular integrated in a mechatronic system and/or appropriately configured and/or programmed. To this end, preferably a computer program for a computer device, in particular for a machine controller that, when loaded into and executed on a computer device, carries out a method according to one embodiment.

Modular application of the disclosure for a multiplicity of automation tasks is made possible by virtue of there being provision for a function block or multiple function blocks of a programmable logic machine controller that is/are configured to carry out a method according to one embodiment. All, individually selected or an arbitrary compiled group of functionalities can be combined in a function block. It is particularly preferred if a function block is configured to implement a method according to one embodiment. Complementarily or additionally, a function block may be configured to implement a method according to one embodiment. It is additionally preferred that, according to one embodiment, there is provision for a network service function block that implements a method according to one embodiment. In summary, one preferred embodiment is that each machine controller has a publisher function block according to one embodiment, a subscriber function block according to one embodiment and a network service function block according to one embodiment and thereby ensures the functionalities according to the disclosure and the configurability according to the disclosure. A publisher function block and/or a subscriber function block can also incorporate the network service functionality.

It is obvious to a person skilled in the art that any refinement feature described herein and any functionality described herein are encompassed in any combination with one or more features of the disclosure that this document contains, even if the relevant combination is not explicitly shown. The relevant combination will also be understood independently of other features, which are explained for example in a context with the combined refinement feature or the combined functionality, as being encompassed by the disclosure, unless explicit statements to the contrary are made in regard to this refinement feature or the functionality. In particular in any list in the text as a whole, the conjunction "and" always also encompasses the meaning "or" and the meaning "and/or"; accordingly, the conjunction "or" always also encompasses the meaning "and" and the meaning "and/or".

BRIEF DESCRIPTION OF THE DRAWINGS

The disclosure is explained in coarsely schematic fashion with reference to exemplary embodiments and drawings. In the drawings, features that are the same or that have the same function are provided with the same reference signs, unless the description indicates otherwise. The technical refinement features shown in a figure are applicable to any variant of the disclosure, specifically even independently of other features that this figure contains and/or describes, for example, unless explicit statements to the contrary are made in regard to this figure or this refinement feature. In the drawings:

FIG. 12 shows a diagnosis functionality.

DETAILED DESCRIPTION

Figure 1:
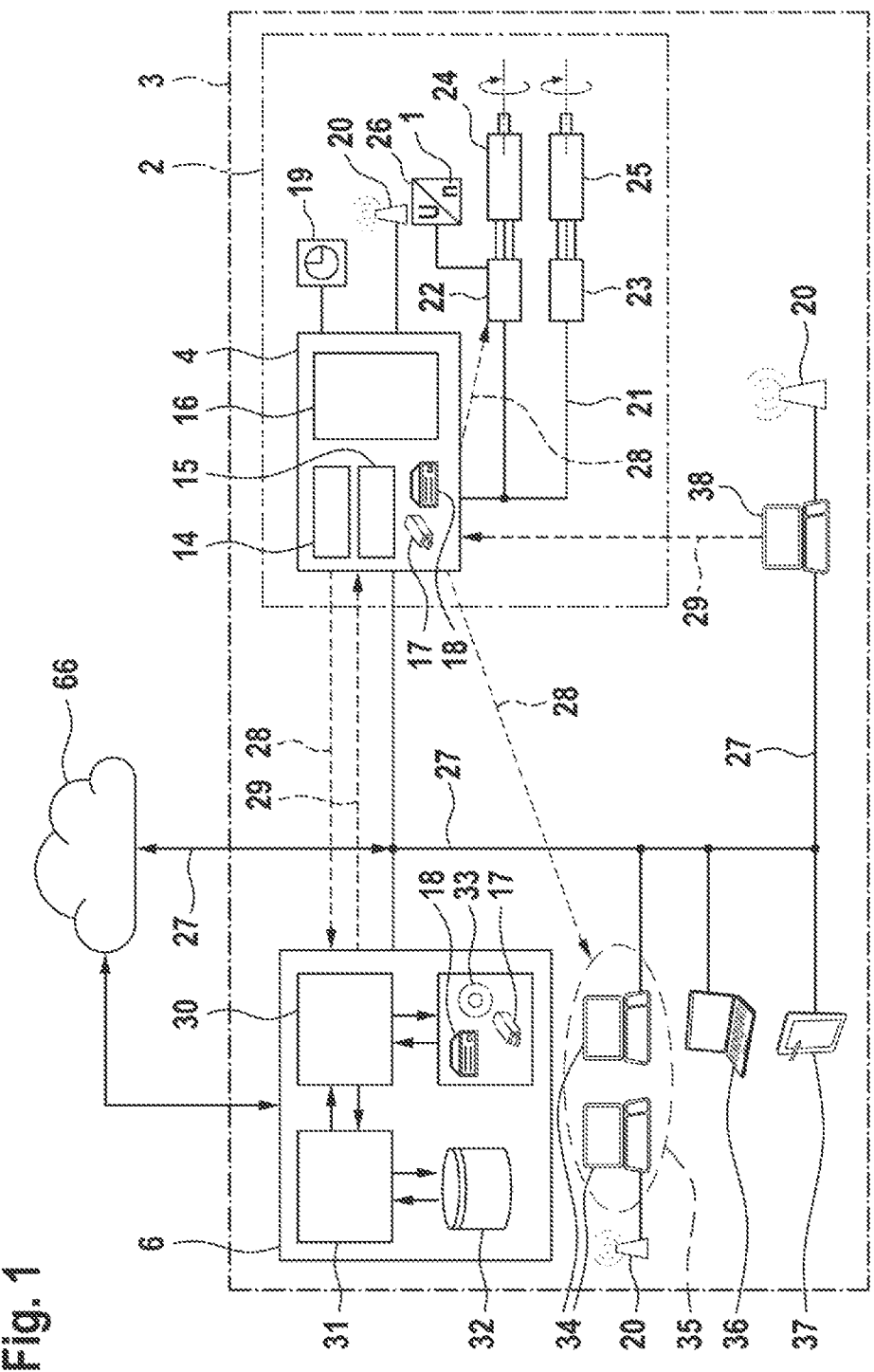
FIG. 1 shows a schematic basic depiction of a mechatronic system having industrial automation components that use a network having a field bus segment to communicate among one another and with other network users.

FIG. 1 shows a schematic basic depiction of a mechatronic system 2. In a mechatronic system 2 of this kind—in particular in an industrial automation system—machine control data 1 are obtained, including, in exemplary fashion in FIG. 1, a speed 1 (interchangeable with machine control data or machine control datum below). The machine control data 1 are communicated in the mechatronic system 2 in a network 3 having multiple network users 4, 6. To this end, the control data 1 are sent in the network 3 by an appropriately configured publisher by means of a data interchange standard that supports a publish/subscribe communication model. The data sent are received by a network user 6, 4 via the network 3 by means of the data interchange standard. In this case, the publisher performs the transmission in the form of network messages 5 (see FIG. 12). The network messages 5 sent are each intended for subscribers selectable as required that are decoupled from the publisher. A subscriber selectively obtains a network message 5 with its control data 1 to be procured, in each case preferably under event control, or selects said network message; additionally or alternatively, the relevant subscriber can also selectively take the control data 1 to be procured from a received/analyzed network message 5.

In the case of the industrial automation system 2 shown, a machine controller 4 of the mechatronic system 2 is incorporated into the network 3 as a network user, specifically firstly via a field bus 21 that connects the machine controller 4 to industrial automation components; secondly via an asynchronous network segment 27 that connects the machine controller 4 to other IT components, such as for example PCs. The machine controller 4 can be configured indiscriminately as a subscriber and/or as a publisher. If it is configured as a publisher, then it provides the control data 1 with a message identifier 7 (in this regard see FIG. 12), codes or decodes the control data by means of the data interchange standard to produce a network message 5 and sends the network message 5 via the network 3. If the machine controller 4 is configured as a subscriber, it receives a network message 5 intended for this subscriber (this then being the machine controller 4) by means of the message identifier 7 via the network 3 and decodes the network message 5 by means of the data interchange standard to produce usable control data 1.

The mechatronic system 2 is designed to be communicative substantially with the industrial automation components by means of the field bus 21. The machine controller 4 has an integrated PLC 14 and a likewise integrated CNC 15. The visualization of machine control data 1 takes place via the display 16, which is likewise integrated in the machine controller 4. In addition, the machine controller 4 has a port for a USB stick 17 for interchanging control data with in particular parties that are not incorporated in the network 3. In addition, there is a hard disk/SSD 18 that acts as an internal data memory of the machine controller and on which control data 1 are also stored, buffered and interchanged between the individual modules. The field bus 21 connects the machine controller 4 to two drive controllers 22, 23. The electric motor 25 is activated by the drive controller 23. The drive controller 22 actuates a servomotor 24. A tachometer 26 is used to return the instantaneous speed 1 (or other data used for actuating and/or monitoring the servo motor 24) to the drive controller 22. The speed 1 is likewise transmitted via the field bus 21 to the machine controller 4, where it is processed and used for communication in accordance with the disclosure. In order to ensure the consistency (in particular consistency over time) of the control data 1, there is inter alia also a clock provided for a system time 19 of the machine controller 4. The control data 1 can be provided with a system time—in particular a system time synchronized throughout the system—for example in the form of a timestamp by means of the clock 19.

The network 3 uses the asynchronous network segment 27 to set up a communication connection between the mechatronic system 2 or components of the mechatronic system 2 and a network infrastructure that is based on an asynchronous (also non-realtime-compatible) network protocol. The asynchronous network segment 27 has been used to incorporate an industrial PC 6. The industrial PC 6 likewise has an internal hard disk/SSD 18 and a port for a USB stick 17 (see above); in addition, a CD/DVD drive 33 is shown in exemplary fashion, this likewise being able to be used to load or forward communicated control data 1 in accordance with the disclosure. Various programs run on the industrial PC 6, of which an OPC-UA-compliant application entity 30 and a PC application 31 for control data 1 (e.g. a control or simulation tool) are shown in exemplary fashion. In the exemplary embodiment shown, the data interchange standard is OPC-UA. The OPC-UA-compliant application entity 30 of the industrial PC 6 is used to make available the OPC-UA-standard-compliant functionalities, in particular the communication via OPC-UA, on a commercially available industrial PC 6. The control data 1 received or sent or decoded or encoded by means of the OPC-UA-compliant application 30 are then bidirectionally interchanged with practically any PC application 31, selectable as required, for control data 1, so that the communication of the control data in accordance with the disclosure is realized. Additionally, the control data 1 become interchangeable with further network users 34, 35, 36, 37, 38 via an OPC-UA-compliant interface. To this end, each network user 4, 6, 34, 35, 36, 37, 38 also has an OPC-UA-compliant interface and/or application.

The asynchronous network segment 27 has additionally also been used to incorporate into the infrastructure:

Office PCs 34 that act in cooperation as an EDGE computing system 35, in which for example analysis tasks or computing tasks relating to the mechatronic system 2 are relocated. One part of the asynchronous network segment 27 is also a wireless transmitter 20, which is likewise used to transmit control data 1, inter alia.

A notebook 36, a tablet 37 and a standalone PC 38, which likewise communicates via a wireless transmitter 20.

A network connection to a cloud 66 accessible via the internet (for example for storing control data 1 with global availability, for example for preventive maintenance or analysis of mechatronic systems 2).

In the exemplary embodiment shown in FIG. 1, the machine controller 4 is configured firstly as a publisher and simultaneously as a subscriber. To this end, the machine controller 4 is incorporated in the mechatronic system 2 as a network user and can communicate control data 1 that are on the machine controller 4 in the whole network 3. In the case of the configuration as a publisher shown, provision is made for three publisher paths 28 from the point of view of the machine controller 4, one of which leads from the machine controller 4 to the industrial PC 6, one of which leads to the EDGE computing system 35, or as an entry to one of the office PCs 34, and one of which leads to the drive controller 22. To this end, the drive controller 22 has a drive-integrated machine controller (not shown here) or a drive-integrated PLC. The publisher paths 28 are physical and/or virtual paths that use the communication infrastructure of the network 3 and are physically realized by means of Ethernet and/or by means of wireless transmitter 20 and/or by means of the field bus 21, for example (this also applies mutatis mutandis to the subscriber paths 29, in this regard see later on).

Additionally when the machine controller 4 is configured as a publisher, it provides the control data with a message identifier 7 (see FIG. 12), encodes said control data as a network message 5 by means of the data interchange standard OPC-UA and sends the network message 5 via the network 3. In the exemplary embodiment shown, network users 6, 35 configured as subscribers in the asynchronous network segment 27 are present that receive the control data 1 published by the machine controller 4 in accordance with the disclosure. As a result, the control data 1 coming from the mechatronic system 2 are made available on the office PC 6 and also in the EDGE computing system 35. Specifically, the industrial PC 6 has an OPC-UA-compliant application entity 30, which is an application running on the industrial PC and communicates bidirectionally with a target PC application 31 for control data 1 and transmits the control data 1 interchanged in OPC-UA-compliant fashion. Generally, an OPC-UA-compliant application entity 30 of this kind or an OPC-UA-compliant application may be present on each of the network users 4, 6, 34, 35, 36, 37, 38. At the same time, a drive controller 22 configured as a subscriber is present that uses the publisher path 28 (as seen from the point of view of the machine controller 4) to receive the control data 1 from the machine controller 4; this can take place physically via the field bus 21, so that the communication of the control data 1 can also take place in real time.

Simultaneously, the machine controller 4 is configured as a subscriber (specifically, as above in the case of the configuration as a publisher too, in each case the control-integrated PLC 14). In this case, it uses the subscriber path 29 (from the machine controller point of view) to receive control data from the industrial PC 6.

Figure 2:
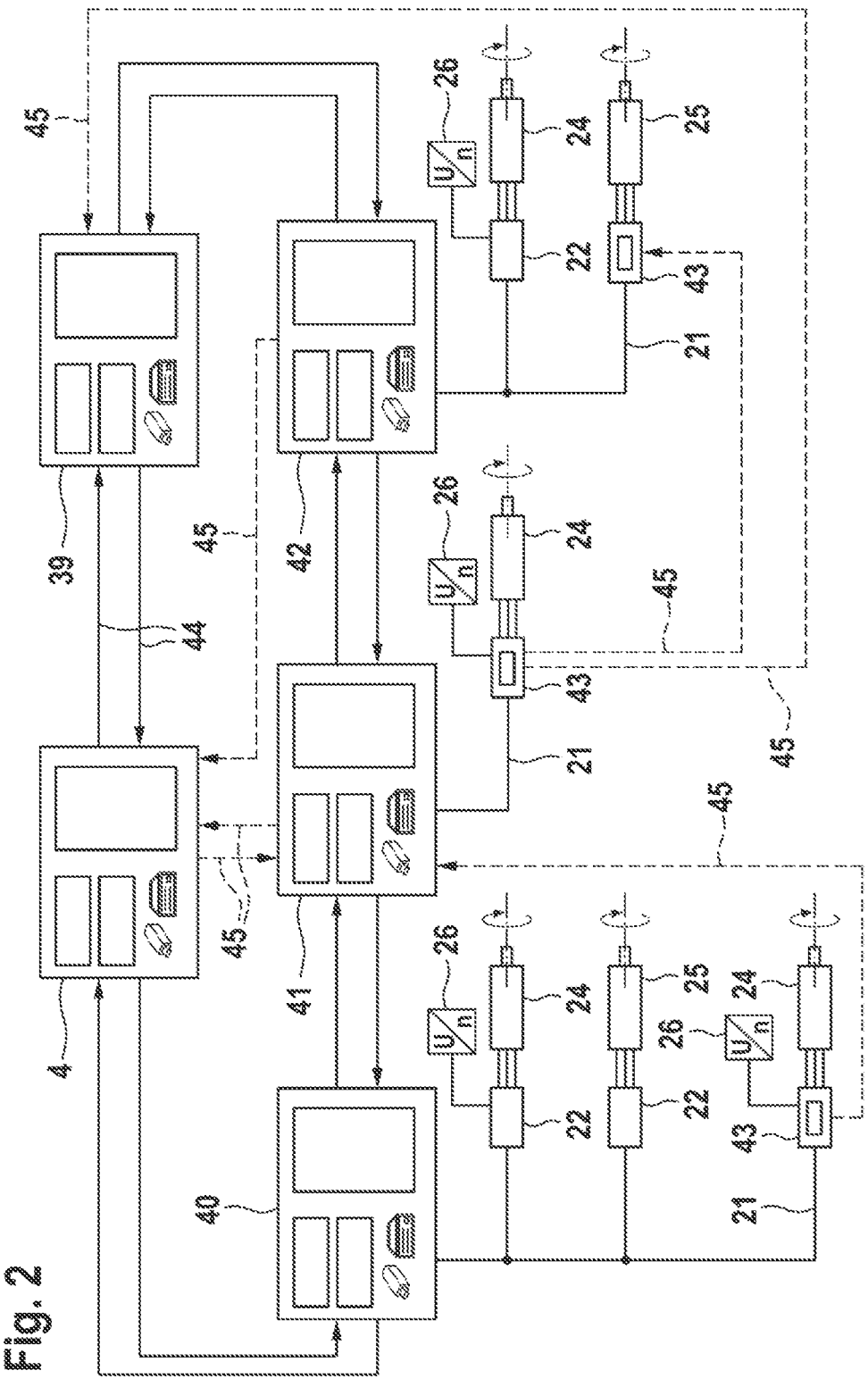
FIG. 2 shows a schematic basic depiction of a mechatronic system having industrial automation components that use a field bus and at the same time use a schematically indicated publish/subscribe communication architecture to communicate among one another and with other network users.

FIG. 2 shows a schematic basic depiction of a mechatronic system 2 having industrial automation components that use a field bus 44 to communicate among one another and with other network users. Specifically, a field bus ring topology 44 connects multiple machine controllers 4, 39, 40, 41, 42 (collectively referred to as 4+ below for the sake of simplicity) so as to communicate among one another in real time; this can be for example a Sercos field bus, an EtherCAT field bus, a Profinet field bus or a TSN based field bus or simply a realtime-compatible TSN network. In the exemplary embodiment shown, the field bus ring topology 44 is an oppositely directed double ring in order to provide, for example, a redundancy suitable for safety applications. As an alternative, a star topology (or any other topology) can be realized for TSN by using a TSN-compatible switch. For the design of the controllers 4+, see the explanations above in each case in regard to FIG. 1. The machine controllers 4, 39 have no further, shown industrial automation components connected to them; by way of example, the machine controller 4 can act as a master. The machine controller 40 has a drive controller 43, having an integrated machine controller (e.g. PLC), connected to it, via a realtime communication medium, namely a field bus 21. Otherwise, another two drive controllers 22, each influencing a servomotor 24 or an electric motor 25, are connected. The machine controller 41 merely has a drive controller 43, having an integrated machine controller, connected to it via the field bus 21, said drive controller influencing a servomotor 24 having a tachometer 26; the tachometer 26 is used to return the speed 1 to the drive controller 43 in each case. Finally, the machine controller 42 has a drive controller 22, having connected servomotor 24/tachometer 26 combination, and a drive controller 43, having an integrated machine controller and an electric motor 25 influenced thereby, connected to it.

Additionally, publish/subscribe communication paths 45, which can be realized virtually or physically, are shown in accordance with the disclosure. By way of example, they can be physically implemented by means of the field bus ring topology 44, or by means of further communication connections, which are not shown here. The machine controller 4 is configured as a publisher and sends control data procured from the machine controller 41, which in this regard is configured as a subscriber, via the communication path 45. Simultaneously, the machine controller 4 is configured as a subscriber for control data 1 procured from the machine controller 41, which in this regard is configured as a publisher. At the same time, the machine controller 4—configured as a subscriber—procures published control data from the machine controller 42 as a publisher. Control data can also be communicated by drives 22, 43 in accordance with the disclosure. To this end, the machine controller 39 is configured as a subscriber for control data 1 published by the drive controller 43, with an integrated machine controller, that is connected to the machine controller 41 via the field bus 21 as a publisher. At the same time, the drive controller 43 connected to the machine controller 42 also procures control data 1 from this drive controller 43 connected to the machine controller 41. Finally, the drive controller 43 connected to the machine controller 40 is configured as a publisher and publishes control data that (inter alia) are received by the machine controller 41, which in this respect is configured as a subscriber, via the communication path 45. Preferably, both the direct communication via the field bus ring topology 44 and the communication via the publish/subscribe communication paths 45 shown take place in real time.

Figure 3:
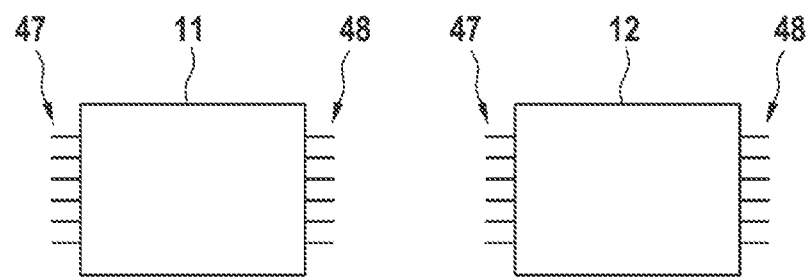
FIG. 3 shows a schematic drawing of modules/function blocks according to the disclosure.

FIG. 3 shows a coarsely schematic view of a modular implementation of the disclosure. The left-hand side of FIG. 3 shows a publisher module 11, which can be embodied in a machine controller 4 as a hardware or software module. It is in particular a function block according to IEC 61131-3, for example of a PLC. The publisher module 11 has module inputs 47 and module outputs 48. If it is a function block of a PLC, then the module inputs 47 are used to prefill variables—also static variables—of the function block. The processing within the context of the disclosure (for example the configuration of the machine controller as a publisher, the provision of the data to be published, the processing of said data, such as for example the encoding of said data as a network message) takes place in the publisher module 11. In particular, the publisher module 11 is individually callable and can configure the machine controller 4 as a publisher and/or can provide the control data 1 with the message identifier 7 and/or can configure said control data as a network message 5 by means of the data interchange standard. Following the processing according to the disclosure, the control data 1 to be output, encoded as a network message 5, are provided at the module outputs 48 of the publisher module 11. In this manner, the publisher module 11 can be used flexibly within a machine controller 4.

The right-hand side of FIG. 3 shows a subscriber module 12, for which the explanations above apply accordingly. The subscriber module 12 also has respective module inputs 47 and module outputs 48 at which the applicable data are present. In the case of the subscriber module 12, the control data 1 are present at the inputs in a manner coded in the form of a network message 5 to be received, for example. Alternatively, it is generally possible for all network messages 5 that can be received by the applicable machine controller 4 to be present at the inputs 47, so that the applicable differentiation according to relevant network messages 5 and control data 1 also takes place during the data processing in the subscriber module 12. The control data 1 and network messages 5 stipulated when the machine controller 4 was configured as a subscriber would then be identified or extracted from the network messages 5 present at the inputs 47, for example. In particular, the individually callable subscriber module 12 is configured to configure the machine controller 4 as a subscriber, to identify and select a network message 5 intended for the subscriber by means of the message identifier 7 and/or to decode said network message as control data 1 by means of the data interchange standard. The control data 1 decoded from the applicable network message 5 are then present at the outputs 48 of the subscriber module 12.

Figure 4:
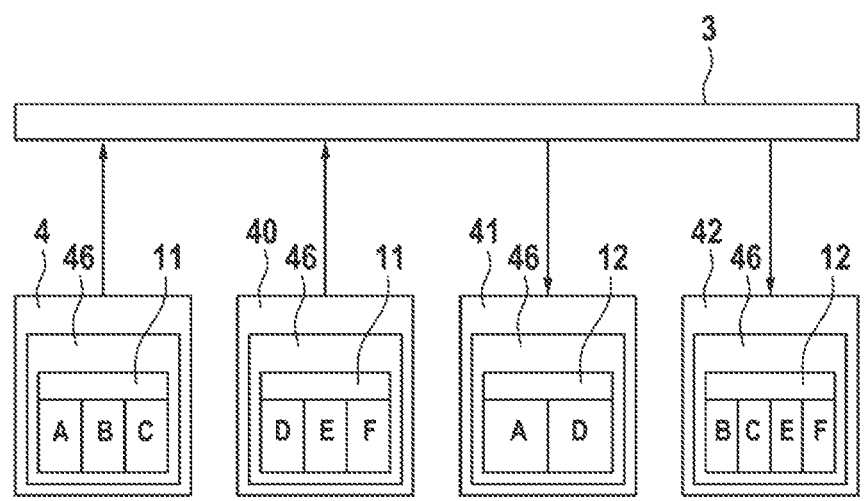
FIG. 4 shows an exemplary configuration of a publish/subscribe communication.

FIG. 4 shows a basic outline of an exemplary configuration of a publish/subscribe infrastructure according to the disclosure. To this end, it shows four machine controllers 4, 40, 41, 42 that communicate via a network 3 infrastructure, which is not specified in more detail. Each of the machine controllers 4, 40, 41, 42 has a control application 46 or PLC application 46 that can be referred to as an OPC-UA application. As a result, the relevant controller becomes the OPC-UA controller. The relevant OPC-UA application 46 is used to bring about the configuration of the relevant machine controllers 4, 40, 41, 42, for example via an operator or else in automated fashion. The machine controllers 4, 40 are configured as publishers; therefore, the publisher module 11 in each of these machine controllers 4, 40 is active and shown in FIG. 4. The machine controllers 41, 42 are configured as subscribers; therefore, the subscriber module 12 in each of these machine controllers 41, 42 is active and shown in FIG. 4. To permit better comprehension of the depiction, specified/configured control data 1 and control data classes are indicated symbolically as A, B, C, D, E, F. The control data A, B, C, D, E, F in this case represent types, volumes, classes or categories, configured for the publish/subscribe communication architecture according to the disclosure, of control data 1 or the control data 1 themselves.

The machine controller 4 publishes the control data A, B, C; these are handed over, encoded as a network message 5, to the network 3 infrastructure within the context of the disclosure, where they are basically accessible to any subscribers, and in particular subscribers decoupled from the machine controller 4. This affords a firstly flexible and secondly very efficient communication option for industrial control data 1 that come from a mechatronic system 2 or are supplied to a mechatronic system 2. The machine controller 40 is likewise configured as a publisher and publishes the control data D, E, F. The statements above in regard to the machine controller 4 apply mutatis mutandis in this case. In the configuration shown, all of the control data A, B, C, D, E, F are therefore available to all of the machine controllers 4, 40, 41, 42 as network users in practically the entire network 3. It is shown in exemplary fashion that two further machine controllers 41, 42 are each configured as a subscriber. The machine controller 41 procures the control data A, D from the network 3, while the machine controller 42 receives the control data B, C, E, F.

Figure 5:
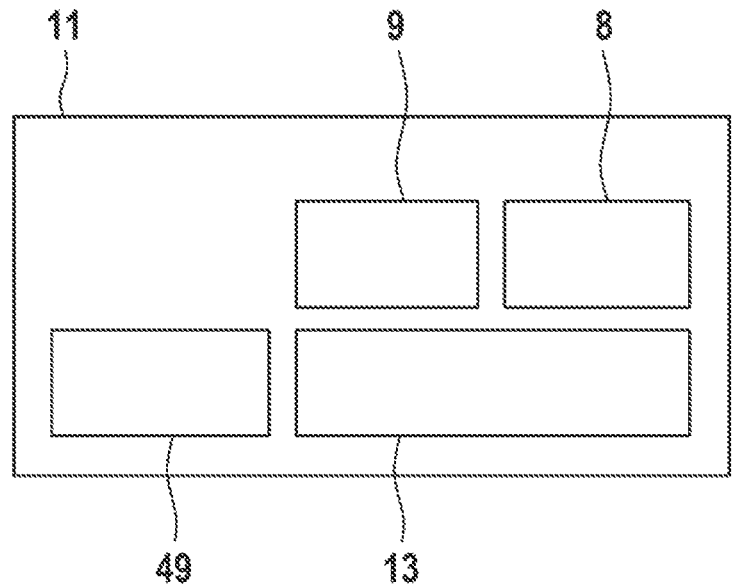
FIG. 5 shows a publisher module according to the disclosure.

FIG. 5 shows the schematic design of a publisher module 11 according to the disclosure. The publisher module 11 has a quality-of-service diagnosis module 8 in which a quality-of-service diagnosis of the network service used to perform the publish/subscribe communication takes place. It also has an encoder module 9 for encoding the control data 1 to produce the network message 5. In addition, there is provision for a configuration module 49, in which the configuration takes place or is provided, prepared and ultimately used for the communication according to the disclosure. Finally, the publisher module 11 shown also has a network service module 13, integrated in the publisher module 11, that sends the network message 5 via the network 3 for the machine controller 4 configured as a publisher.

Figure 6:
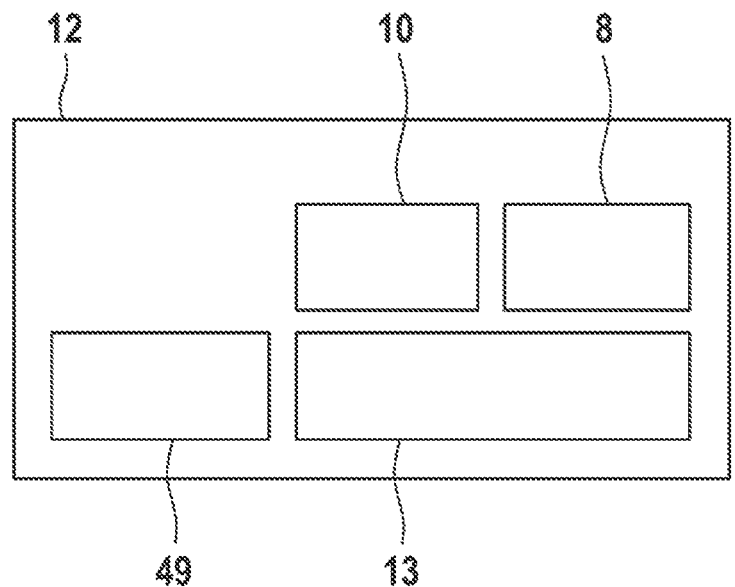
FIG. 6 shows a subscriber module according to the disclosure.

FIG. 6 shows a subscriber module 12 in an analogous depiction; mutatis mutandis, the explanations for FIG. 5 in regard to the publisher module 11 apply accordingly. By contrast, the subscriber module 12 has a decoder module 10 that decodes the received network message 5 as control data 1 by means of the data interchange standard. In the quality-of-service diagnosis module 8, a diagnosis of the quality of service of the network used is again effected, specifically in particular on the basis of the quality of the respectively received and evaluated network messages 5. The network service module 13 shown has the task, as an individually callable module integrated in the subscriber module 12, of receiving the network message 5 via the network 3.

Specifically, referring to FIGS. 5 and 6 at the same time, the disclosure works as follows:
the encoder module 9 encodes the data and produces a network message 5, for example in line with UADP protocol
the decoder module 10 decodes the network message 5 and returns the decoded control data 1 as usable data
the diagnosis module 8 evaluates the quality of service in the respective network messages 5 and returns a structure with information concerning this network quality evaluation
the network service module sends and receives the network messages; said module is configurable such that it is possible to select between/configure TSN, UDP and raw Ethernet, for example, without restriction
the configuration module 49 (for example a function block of a PLC or an integrated module) is configurable, preferably even online or remotely, by means of mechanisms of the data interchange standard, in particular by means of standardized OPC-UA mechanisms.

Figure 7:
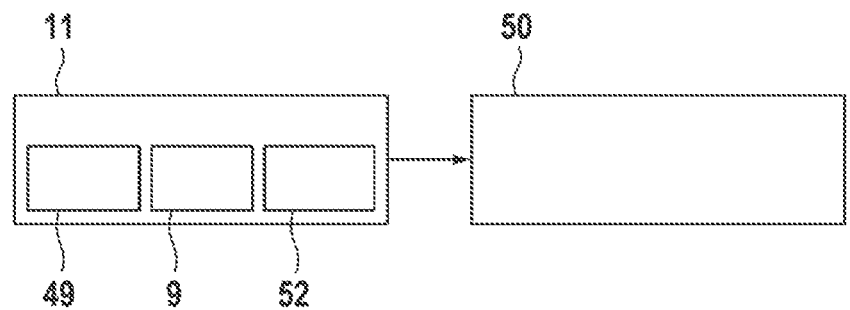
FIG. 7 shows a publisher module having a separate, connected network service module.
Figure 8:
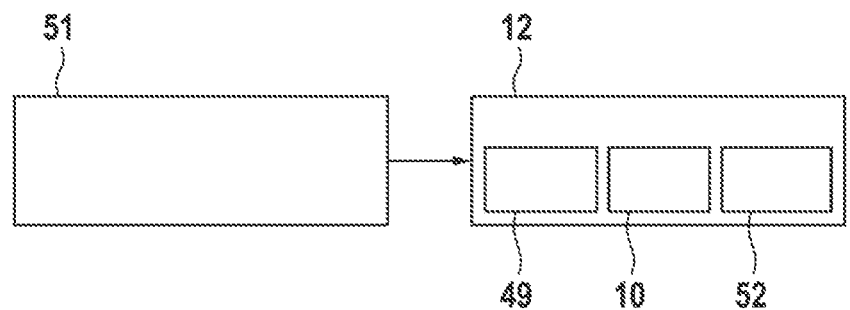
FIG. 8 shows a subscriber module having a separate, connected network service module.

Referring to FIGS. 7 and 8, the explanations above with regard to FIGS. 5 and 6 apply accordingly. In FIGS. 7 and 8, however, there is by contrast provision for a separate network service transmitter module 50 and network service receiver module 51; these modules can each be realized as a function block of a PLC and called individually. In the exemplary embodiment shown in FIG. 7, there is provision for a publisher module 11 that has a configuration module 49, the encoder module 9 and a diagnosis module 52. The network message 5 generated as such from the publisher module 11 is (inter alia) handed over to the network service transmitter module 50 and made available or published or sent by the latter via the network 3 as appropriate.

In FIG. 8, the network message 5 is received by the network service receiver module 51 and forwarded to the subscriber module 12, in which the configuration, the decoding and the quality-of-service diagnosis take place in the modules shown there.

Figure 9:
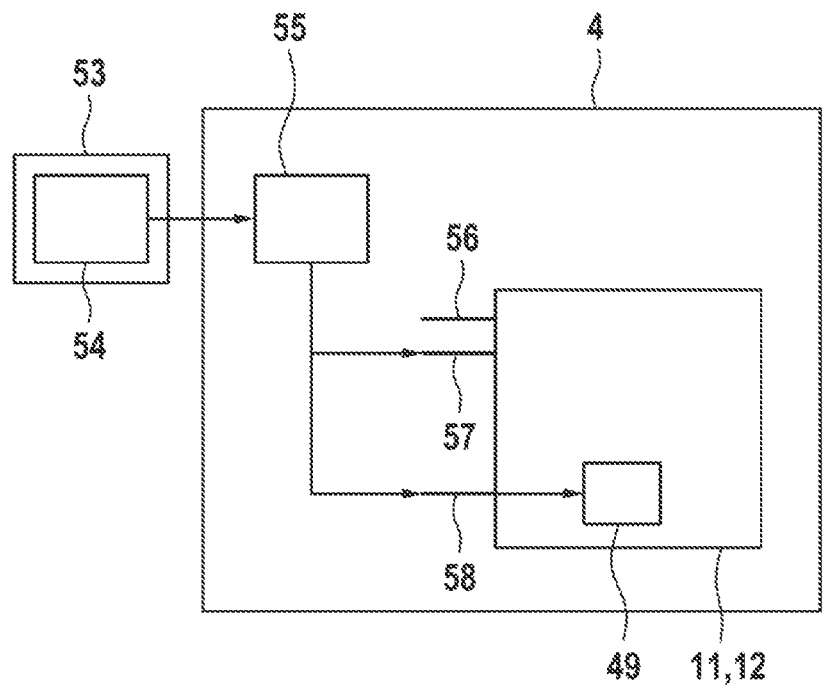
FIG. 9 shows a schematic depiction of a configuration functionality for a publish/subscribe architecture.

FIG. 9 shows an exemplary implementation of a configuration option for the publish/subscribe communication according to the disclosure. To this end, an OPC-UA client 54, which is depicted as an application entity in FIG. 9, is installed on a PC 53. Such an application can perform configuration of the machine controller 4 as a publisher and/or as a subscriber by means of local connection to a controller 4 or by means of a network communication with the controller 4 (this being symbolized in FIG. 9 by a simple arrow in each case). To this end, an OPC-UA server 55, which is intended for the OPC-UA-compliant communication of configuration information, runs on the machine controller 4.

The configuration information—as soon as it has been received from the OPC-UA server 55 and evaluated—is respectively forwarded to a publisher module 11 and a subscriber module 12 via a reconfiguration input 57. The inputs of the publisher module 11 and of the subscriber module 12 are configured for this as appropriate. They moreover also have an execute input 56 and a further input 58 that picks up the publish/subscribe structure (the publish/subscribe structure input 58). The publish/subscribe structure input 58 forwards the received structure data to an integrated configuration module 49, where they are processed further and evaluated or applied as appropriate.

Referring to FIG. 9, the way in which the online or remote configuration shown works is as follows:
The OPC-UA server 55 publishes the applicable module or the existence and the information about the applicable module 11, 12 or the available publish/subscribe structure and/or the logic variable "reconfiguration" corresponding to the reconfiguration input 57. In this manner, the publish/subscribe structure is initially changed/created afresh/erased; once this has taken place, the logic variable at the reconfiguration input 57 is—manually or automatically—set to "TRUE". This changes the configuration of the applicable function module 11/12. A side-effect of such a configuration can be that one or more cycles during the communication are lost. This brief loss of communication is likewise allowed for in the respective function block or function module 11/12, for example by setting or communicating status information in this regard, which status information triggers corresponding reactions from the parties. The configuration or the configuration module 49 can be provided remotely and/or directly in the machine controller 4 and/or online each time in this case. Alternatively or additionally, the configuration takes place at the runtime of the machine controller 4.

Figure 10:
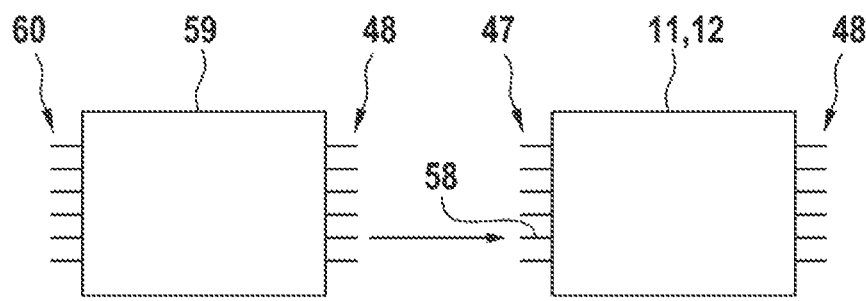
FIG. 10 shows configuration support for a publish/subscribe architecture.

FIG. 10 uses the example of a publisher module 11 and a subscriber module 12 to schematically show automated or semiautomated support for the configuration of a publish/subscribe communication architecture according to the disclosure. To this end, there is in turn provision for a configuration support module 59 whose inputs 60 for simplified configuration each have reduced communication parameters present at them or a reduced or minimal set of configuration parameters. After these reduced (simplified) communication parameters have been read into the configuration support module 59, they are added to there as appropriate to produce a complete or adequate set of communication parameters, so that a complete or adequate communication structure for the publish/subscribe configuration is present at each of the module outputs 48. This configuration structure is forwarded via the applicable outputs of the module 59 to the applicable function module 11/12, specifically via the respective publish/subscribe structure input 58 thereof.

The reduced set of parameters present at the inputs 60 for simplified configuration can be prescribed externally—for example by a user. This sets the relevant parameters in a simple manner for the configuration by means of external inputs (for example by means of user inputs). Additionally, the disclosure provides for the configuration support module 59 to automatically add to or prefill predetermined communication parameters during the configuration (automated communication parameters).

Figure 11:
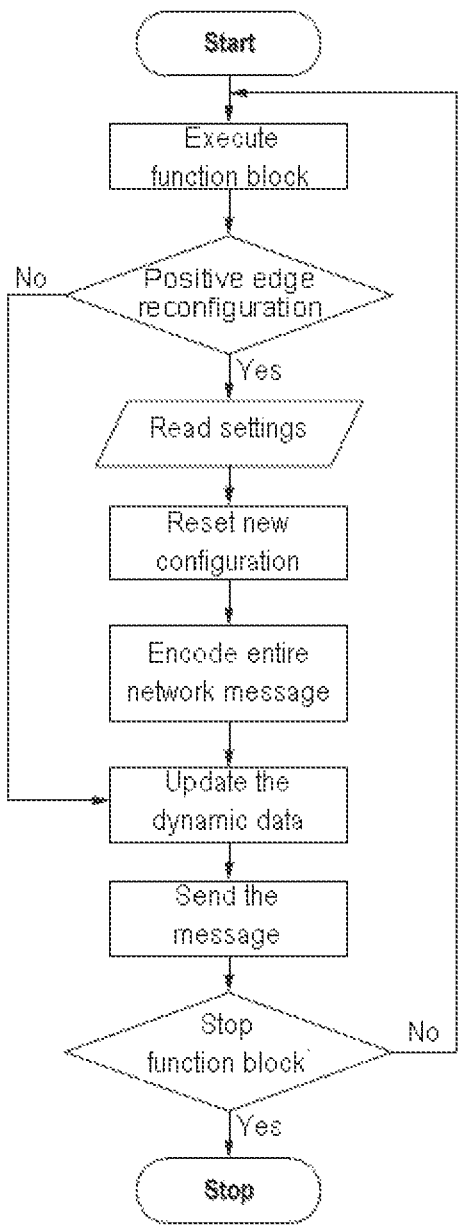
FIG. 11 shows a flowchart for a method sequence with efficient timing, in particular for a real time mode of the disclosure.

In particular for a realtime mode of the disclosure, there can be provision for performance of the method in a manner optimized or definitively improved in respect of the temporal efficiency or the time sequence. To this end, FIG. 11 provides a coarsely schematic flowchart. Accordingly, the start of the method according to the disclosure is followed by a module—in particular a function block—being called and executed; this can be for example a publisher module 11 or subscriber module 12 according to the disclosure (in each case with an integrated configuration module 49) or else a separate configuration module 49 connected to such a publisher module 11 and/or subscriber module 12. According to the disclosure, scanning is effected at runtime to ascertain whether a reconfiguration is present (this is the case when the reconfiguration input 57 (see FIG. 9) is positive or has a positive edge for a function block of a PLC). If this is not the case (reconfiguration=FALSE), the process branches directly to a reduced or minimal update activity that affects only the dynamic control data 1, or updates only these. If reconfiguration=TRUE, then the reconfiguration settings are read—for example from the publish/subscribe structure input 58 —, the configuration is then reset and the new configuration is loaded or set. The whole network message currently present is then encoded/decoded, and the dynamic data are then in turn updated in reduced fashion. After this step, the applicable network message 5 is sent. This is followed by a query to ascertain whether there are still pending tasks for the relevant function module 11, 12, 49; this is represented in FIG. 11 by the query "stop function block". If the result is positive (no further tasks pending), the method is stopped; otherwise, it branches to the relevant function module 11, 12, 49.

Finally, FIG. 12 shows a quality-of-service diagnosis module 8 (this can also be an integral part of a publisher module 11 and/or of a subscriber module 12). The quality-of-service diagnosis module 8 again has module inputs 47 and module outputs 48; at one of the module inputs 47, a network message 5 is present, the structure of which is indicated schematically in FIG. 12. Accordingly, the network message 5 comprises a header 62 containing information such as for example routing information for the network message 5 and/or also the message identifier 7 according to the disclosure. Further on in the structure of the network message 5 there follows the payload 63, which substantially features the useful content of the network message 5, that is to say the control data 1 according to the disclosure. In addition, there is provision in the structure of the network message 5 for a portion for quality-of-service data 64, before the network message concludes with the tail 65 (that is the end of the network message 5). The network message 5 is evaluated in the function module 8, 11, 12 as appropriate; this also involves the quality-of-service data 64 being read and being processed to produce a quality-of-service diagnosis structure 61 or to produce a quality-of-service diagnosis result 61, which is output at one of the module outputs 48 of the function module 8, 11, 12.

The quality-of-service data 64 encompass in particular: a timestamp with minimum time, maximum time, average time, time of reception/sending of the last message; a sequence number; an error counter; a statement about the time that has elapsed since the last, lost packet; a status with an indication of the status code of the network message 5; a version identifier with a version check.

LIST OF REFERENCE SIGNS

1 Speed
2 Mechatronic system
3 Network
4 Machine controller
5 Network message
6 Industrial PC
7 Message identifier
8 Quality-of-service diagnosis module
9 Encoder module
10 Decoder module
11 Publisher module
12 Subscriber module
13 Network service module
14 Programmable logic controller
15 CNC (Computer Numeric Control)
16 Display
17 USB stick
18 Hard disk/SSD
19 System time
20 Wireless transmitter
21 Field bus
22 Drive controller
23 Drive controller
24 Servomotor
25 Electric motor
26 Tachometer
27 Asynchronous network segment
28 Publisher path (machine controller point of view)
29 Subscriber path (machine controller point of view)
30 OPC-UA-compliant application entity
31 PC application for control data
32 Hard disk/SSD
33 CD/DVD
34 Office PCs
35 Edge computing system
36 Notebook
37 Tablet
38 PC
39 Machine controller
40 Machine controller
41 Machine controller
42 Machine controller
43 Drive controller with integrated machine controller
44 Field bus ring topology
45 Publish/subscribe communication path between controllers
46 Control application/PLC application
47 Module inputs 48 Module outputs
49 Configuration module
50 Network service transmitter module
51 Network service receiver module
52 Diagnosis module
53 PC
54 OPC-UA client
55 OPC-UA server
56 Execute input
57 Reconfiguration input
58 Publish/subscribe structure input
59 Configuration support module
60 Inputs for simplified configuration
61 Diagnosis result and diagnosis structure
62 Header
63 Payload
64 Quality-of-service data
65 Tail
66 Cloud
A,B,C,D,E,F Specified/configured control data/control data classes

What is claimed is:

1. A method for communicating machine control data of a mechatronic system in a network having (i) at least one publisher network user, (ii) at least one subscriber network user, and (iii) a machine controller of the mechatronic system, the method comprising:
sending, with the at least one publisher network user, a plurality of network messages having machine control data via the network using a data interchange standard that supports a publish/subscribe communication model, each network message of the plurality of network messages intended for a selected subscriber network user of the at least one subscriber network user, the selected subscriber network user decoupled from the at least one publisher network user;
receiving, with the at least one subscriber network user, the plurality of network messages having the machine control data via the network using the data interchange standard, the at least one subscriber network user at least one of (i) selectively receiving, under event control, network messages of the plurality of network messages having particular machine control data to be procured, and (ii) selectively taking the particular machine control data to be procured from the plurality of network messages; and
operating the machine controller simultaneously as (i) a publisher network user of the at least one publisher network user, and (ii) a subscriber network user of the at least one subscriber network user, such that the machine controller is configured to:
send a respective network message of the plurality of network messages having the machine control data with a message identifier via the network, the machine controller encoding the respective network message using the data interchange standard, and
receive a respective network message of the plurality of network messages having the machine control data with a message identifier via the network, the machine controller decoding the respective network message using the data interchange standard,
controlling a drive controller according to the plurality of network messages with an integrated CNC controller operably connected to the publisher module, the subscriber module, and the drive controller.

2. The method according to claim 1, wherein:
the machine controller, when sending the respective network message, provides at least one of (i) the machine control data to be encoded, and (ii) the respective network message to be encoded in a memory; and
the machine controller, when receiving the respective network message, provides at least one of (i) the respective network message that is decoded, and (ii) the machine control data that is decoded in the memory.

3. The method according to claim 1, wherein:
the encoding and decoding are performed according to methods of the data interchange standard, and
the machine controller includes an integrated programmable logic controller.

4. The method according to claim 1 further comprising:
configuring, at least one of at runtime, remotely, and in the machine controller, at least one of (i) the sending and the receiving of the machine control data, (ii) a type of the machine control data, (iii) a content of the machine control data, and (iv) a volume of the machine control data.

5. The method according to claim 4 further comprising:
automatically prefilling, during the configuring, predetermined communication parameters using the machine controller.

6. The method according to claim 5 further comprising:
stipulating, during the configuring, the predetermined communication parameters via external user inputs.

7. The method according to claim 4, wherein the configuring is performed using method calls of the data interchange standard for methods of the machine controller.

8. The method according to claim 1, wherein the sending and the receiving of the machine control data takes place in real time.

9. The method according to claim 1 further comprising:
diagnosing a quality-of-service of a network message of the plurality of network messages.

10. The method according to claim 1, wherein the encoding and decoding are performed according to a standardized coding format, the standardized coding format being UADP (Unified Architecture Datagram Packet).

11. The method according to claim 1, wherein an individually callable publisher module is configured to (i) operate the machine controller as one of the at least one publisher network user, (ii) provide the machine control data with the message identifier, and (iii) encode the respective network message using the data interchange standard.

12. The method according to claim 1, wherein an individually callable subscriber module is configured to (i) operate the machine controller as one of the at least one subscriber network user and (ii) decode the respective network message intended for the machine controller as machine control data using the message identifier using the data interchange standard.

13. The method according to claim 11, wherein a network service module, which is one of individually callable and integrated in another module, is configured to (i) receive the respective network message via the network when the machine controller is operated as one of the at least one subscriber network user, and (ii) send the respective network message via the network when the machine controller is operated as one of the at least one publisher network user.

14. A machine controller for communicating machine control data of a mechatronic system in a network, the network having (i) at least one publisher network user, (ii) at least one subscriber network user, and (iii) the machine controller, at least one publisher network user configured to send a plurality of network messages having machine control data via the network using a data interchange standard that supports a publish/subscribe communication model, each network message of the plurality of network messages intended for a selected subscriber network user of the at least one subscriber network user, the selected subscriber network user decoupled from the at least one publisher network user, the at least one subscriber network user configured to receive the plurality of network messages having the machine control data via the network using the data interchange standard, the at least one subscriber network user at least one of selectively receiving, under event control, network messages of the plurality of network messages having particular machine control data to be procured, and selectively taking the particular machine control data to be procured from the plurality of network messages, the machine controller comprising:

- a publisher module configured to selectively configure the machine controller as a publisher network user of the at least one publisher network user, and to send a respective network message of the plurality of network messages having the machine control data with a message identifier via the network, the machine controller encoding the respective network message using the data interchange standard; and
- a subscriber module configured to selectively configure the machine controller as a subscriber network user of the at least one subscriber network user, and to receive a respective network message of the plurality of network messages having the machine control data with a message identifier via the network, the machine controller decoding the respective network message using the data interchange standard,
- an integrated CNC controller operably connected to the publisher module, the subscriber module, and a drive controller,
- wherein the publisher module and the subscriber module are further configured to selectively configure the machine controller as the publisher network user and the subscriber network user simultaneously, and
- wherein the CNC controller is configured to control the drive controller according to the plurality of network messages.

15. The method according to claim 1, wherein:

the machine controller executes a computer program stored on a non-transitory computer readable medium to perform the sending and receiving, and wherein the computer program has at least one function block having programmable logic.

16. The method according to claim 15, wherein one of the at least one function block is an individually callable publisher module configured to (i) configure the machine controller one of the at least one publisher network user, (ii) provide the machine control data with the message identifier and (iii) encode the respective network message using the data interchange standard.

17. The method according to claim 15, wherein one of the at least one function block is an individually callable subscriber module configured to (i) configure the machine controller as one of the at least one subscriber network user and (ii) decode the respective network message intended for the machine controller as machine control data using the message identifier using the data interchange standard.

18. The method according to claim 15, wherein one of the at least one function block is a network service module, which is one of individually callable and integrated in another module, configured to (i) receive the respective network message via the network when the machine controller is configured as one of the at least one subscriber network user, and (ii) send the respective network message via the network when the machine controller is configured as one of the at least one publisher network user.

19. The machine controller according to claim 14, further comprising:

an integrated programmable logic controller.

* * * * *